United States Patent
Cass

(10) Patent No.: US 10,566,783 B2
(45) Date of Patent: Feb. 18, 2020

(54) METHODS AND APPARATUS FOR IMPLEMENTING OVER-TEMPERATURE FAULT PROTECTION IN WEARABLE DEVICES AND OTHER ELECTRONIC DEVICES

(71) Applicant: Intel Corporation, Santa Clara, CA (US)

(72) Inventor: Devin Cass, San Francisco, CA (US)

(73) Assignee: INTEL CORPORATION, Santa Clara, CA (US)

(*) Notice: Subject to any disclaimer, the term of this patent is extended or adjusted under 35 U.S.C. 154(b) by 300 days.

(21) Appl. No.: 15/485,142

(22) Filed: Apr. 11, 2017

(65) Prior Publication Data

US 2018/0294637 A1    Oct. 11, 2018

(51) Int. Cl.
*G01K 7/22* (2006.01)
*H02H 5/04* (2006.01)
*G06F 5/01* (2006.01)

(52) U.S. Cl.
CPC .............. *H02H 5/042* (2013.01); *G01K 7/22* (2013.01); *G06F 5/01* (2013.01)

(58) Field of Classification Search
CPC .......... H02H 5/042; G01K 3/005; G01K 7/22; G01K 7/16; G01K 7/24; G01K 7/206
USPC .................................................. 361/103, 106
See application file for complete search history.

(56) References Cited

U.S. PATENT DOCUMENTS

| | | | | |
|---|---|---|---|---|
| 3,559,883 A | * | 2/1971 | Buiting | G05D 23/1909 219/505 |
| 4,125,107 A | * | 11/1978 | Nurnberg | F24S 50/40 126/587 |
| 4,314,197 A | * | 2/1982 | Sandler | H05B 6/6452 219/715 |
| 4,647,834 A | * | 3/1987 | Castleman | H02J 7/008 320/141 |
| 5,023,431 A | * | 6/1991 | Roberge | G05D 23/24 219/494 |
| 5,619,430 A | | 4/1997 | Nolan et al. | |

(Continued)

FOREIGN PATENT DOCUMENTS

| | | |
|---|---|---|
| CN | 103513106 | 1/2014 |
| CN | 105784179 | 7/2016 |

OTHER PUBLICATIONS

Texas Instruments, "bq27742-G1 Single-Cell Li-Ion Battery Fuel Gauge with Programmable Hardware Protection," Mar. 2014, revised Feb. 2016, 48 pages.

(Continued)

*Primary Examiner* — William H. Mayo, III
(74) *Attorney, Agent, or Firm* — Hanley, Flight & Zimmerman, LLC

(57) ABSTRACT

Implementing over-temperature fault protection in wearable devices and other electronic devices may be performed using an example apparatus including a voltage source; a thermistor bias network to, when enabled, output a thermistor voltage; an over-temperature determiner to enable the thermistor bias network; and, when the thermistor voltage corresponds to a temperature above a maximum temperature threshold, output a fault; and an isolation transistor to couple the voltage source to a system; and when the over-temperature determiner outputs the fault, decouple the voltage source from the system.

17 Claims, 6 Drawing Sheets

(56) References Cited

U.S. PATENT DOCUMENTS

| | | | | |
|---|---|---|---|---|
| 5,903,137 | A | * | 5/1999 | Freiman ................ H02J 7/0004 |
| | | | | 320/112 |
| 6,091,747 | A | * | 7/2000 | Morita .................... H01S 5/042 |
| | | | | 372/26 |
| 6,917,237 | B1 | * | 7/2005 | Tschanz .................. G05F 3/205 |
| | | | | 327/513 |
| 8,118,487 | B2 | | 2/2012 | Goh et al. |
| 2009/0014433 | A1 | * | 1/2009 | O'Neil ................... G06F 1/206 |
| | | | | 219/491 |
| 2009/0016408 | A1 | * | 1/2009 | Doan ..................... G01K 3/005 |
| | | | | 374/164 |
| 2010/0188456 | A1 | | 7/2010 | Gadke et al. |
| 2016/0064979 | A1 | * | 3/2016 | Huang .................. H02J 7/0055 |
| | | | | 320/114 |

OTHER PUBLICATIONS

SII Semiconductor Corporation, "Battery Protection IC for 1-Cell Pack," S-82A1A Series, 2016, 44 pages.

* cited by examiner

METHODS AND APPARATUS FOR IMPLEMENTING OVER-TEMPERATURE FAULT PROTECTION IN WEARABLE DEVICES AND OTHER ELECTRONIC DEVICES

FIELD OF THE DISCLOSURE

This disclosure relates generally to system fault protection, more particularly, to methods and apparatus for implementing over-temperature fault protection in wearable devices and other electronic devices.

BACKGROUND

Wearable devices include clothing or accessories having electrical components to perform functions such as track physical activity, tell time, measure a heart rate, determine location, send emails/messages, make phone calls, etc. Wearable devices include smart watches, activity trackers, bracelets, clothing, shoes, ring, etc. As technology advances, the processing power of the processors used in such wearable devices has drastically increased, thereby increasing the popularity of such wearable devices. As wearable device technology advances, such electronic components require more power to provide power to the components.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
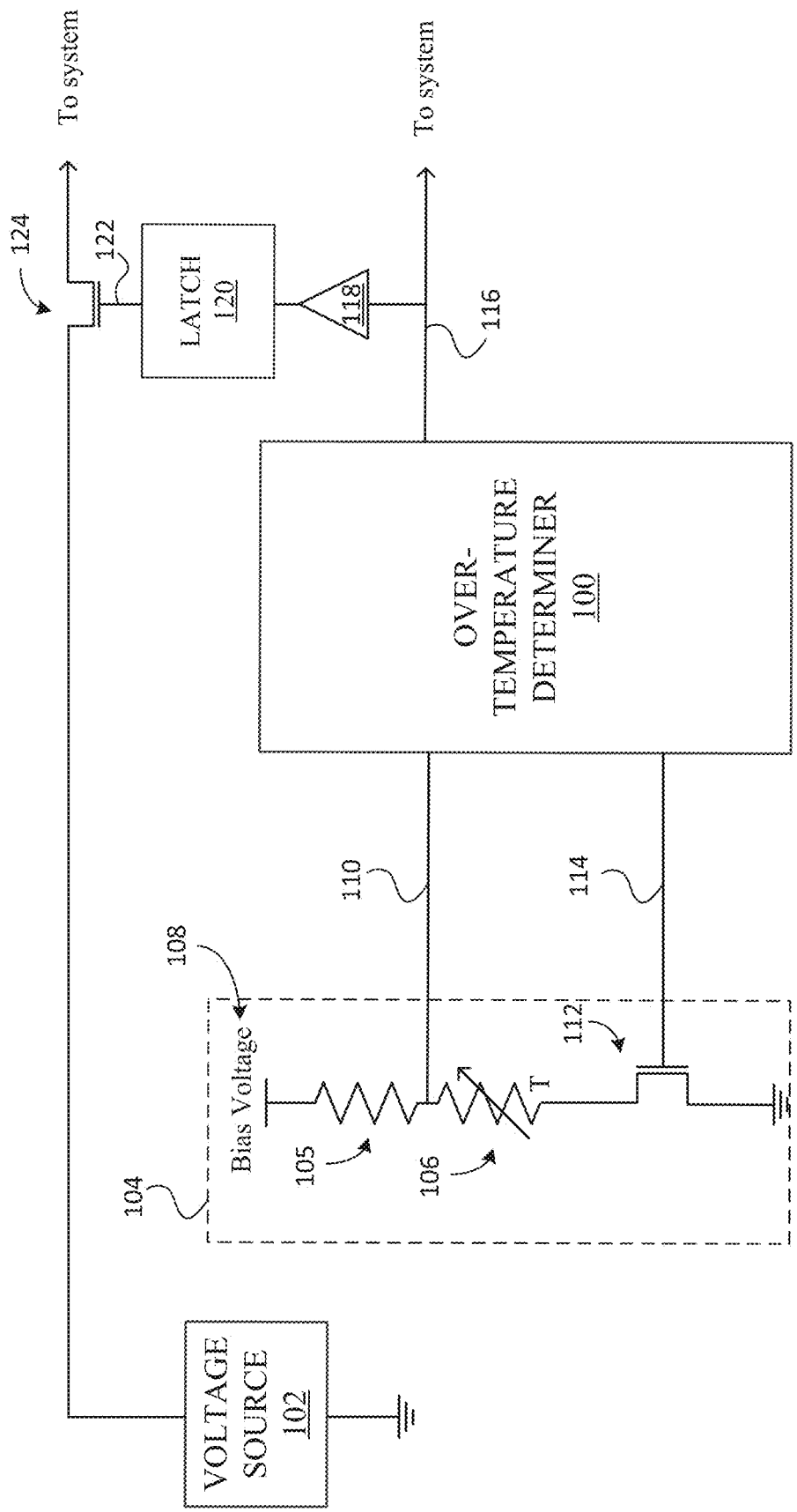
FIG. 1 illustrates an example over-temperature protection device to decouple an example voltage source from a system.

Connected wearable devices are devices that are worn or otherwise attached to the body of a user and have the capability to connect and/or communicate with other network devices. Connected wearable devices are devices that generally include a processor or a processing device to perform one or more functions. Connected wearable devices include smart watches, activity monitors, global positioning system (GPS) enabled bracelets, and/or any other electronic device that may be worn or used within close proximity to a user. Such wearable devices include a voltage source (e.g., one or more lithium ion batteries) to power the processor and/or other electronic components of the wearable device. The voltage source may generate high electric currents compared to the size and thermal dissipation capabilities of the processor and/or other electric components to which the voltage source supplies power. Mechanical, electrical, or software malfunctions may result in significant current drawn from the voltage source, thereby resulting in an increase in temperature of the wearable device (e.g., the person wearing a smart watch). In some instances, the temperature may be increased high enough to burn or otherwise irritate a user of the device. Examples disclosed herein prevent the temperature of electronic devices, such as wearable devices, from increasing to a temperature above a maximum temperature threshold by decoupling the voltage source from the system (e.g., processor and/or other electronic components) when a temperature exceeds a threshold level, thereby powering down the system.

Some traditional techniques for monitoring temperature of electronic devices include mounting a thermistor (e.g., an electrical resistor whose resistance varies with temperature) to a printed circuit board (PCB) and inferring the temperature of the electronic device based on a reading of the thermistor and prior knowledge of thermal characteristics of heat transfer between the PCB and the device's enclosure. Such traditional techniques include implementing an Analog-to-Digital converter (ADC) to convert the thermistor reading into a digital value to determine when the temperature is above a threshold (e.g., a temperature that may be hazardous to a user). However, the ADC of such traditional techniques requires significant power to operate. Additionally, such traditional techniques require the processor of the electronic device to periodically process the output of the ADC to determine whether the temperature is too high, which consumes additional power and processor resources. Examples disclosed herein alleviate the problems associated with such traditional techniques by using a low-power solution having very few components, thereby saving power, resources, and space.

Examples disclosed herein can be implemented in an electronic device where temperature level may be an issue. Examples disclosed herein may be implemented using hardware components to trigger decoupling (e.g., isolation) of a voltage supply from the electronic device. For example, digital logic components, such as a Complex Programmable Logic Device (CPLD), along with a comparator, a thermistor, a resistor, and transistors may be used to implement over-temperature protection in an electronic device. As used herein, over-temperature corresponds to a temperature that is above a maximum temperature threshold. In some examples, an isolation transistor may be used as a switch to enable the coupling of the voltage source to the rest of the electronic device. In such examples, the isolation transistor may be disabled to decouple the voltage source from the rest of the electronic device when the temperature of the system is above a predetermined threshold (based on a temperature reading corresponding to a measurement by a thermistor bias network). A thermistor bias network includes the thermistor that may be used to generate a thermistor voltage corresponding to a system temperature. To further reduce power consumption of the over-temperature protection circuit, a second transistor may be included in the thermistor bias network to enable and/or disable a thermistor bias network. In this manner, the temperature can be polled (e.g., by toggling the thermistor bias network on and off), thereby reducing the average power dissipation in the resistance of the thermistor and/or any other resistor in the thermistor bias network.

As described above, examples disclosed herein include a comparator. The comparator compares the thermistor voltage taken from the thermistor bias network to a reference voltage. The reference voltage is a voltage corresponding to the threshold temperature. In this manner, the comparator's output reflects whether the temperature of the device satisfies (e.g. is above) the threshold temperature. Additionally, examples disclosed herein toggle the analog comparator on and off to reduce average power dissipation in the comparator. The output of the comparator is used to trigger a thermal fault signal. The thermal fault signal triggers the decoupling of the voltage source from the system. In some examples, the fault trigger is also transmitted to a processor and/or other components of the system. In this manner, the system can prepare for shut down (e.g., save current configurations, pointers, variables, and/or any other data).

Because the comparator and the thermistor require some settling time, and/or to avoid race conditions, examples disclosed herein include a buffer when polling the comparator and/or thermistor bias network. The buffer allows potentially inaccurate data to be dismissed during the settling time, thereby eliminating false thermal fault triggers associated with inaccurate readings during settling times. Although examples disclosed herein are described in conjunction with wearable devices, examples disclosed herein may be implemented in any type of device in which over-temperature may be a problem. Using examples disclosed herein, over-temperature protection is realized with a small number of commonly available logic elements while keeping power consumption low (e.g., below 10 microamps).

FIG. 1 illustrates an example over-temperature determiner 100 to decouple an example voltage source 102 from a system based on a temperature-based voltage measured by an example thermistor bias network 104. The example of FIG. 1 includes the example over-temperature determiner 100, the example voltage source 102, the example thermistor bias network 104, an example resistor 105, an example thermistor 106, an example bias voltage 108, an example thermistor voltage 110, an example transistor 112, an example control signal 114, an example thermal fault signal 116, an example buffer 118, an example latch 120, an example latch output 122, and an example isolation transistor 124. Although, the illustrated example of FIG. 1 is described a circuit within, or otherwise connected to, a wearable device, the illustrated example of FIG. 1 may be used in any type of system.

The example over-temperature determiner 100 of FIG. 1 monitors temperatures based on the example thermistor voltage 110 from the example thermistor bias network 104. When the example over-temperature determiner 100 determines that the example thermistor voltage 110 corresponds to a temperature above a maximum temperature threshold, the example over-temperature determiner 100 outputs the example thermal fault signal 116 as a high voltage (e.g., a voltage corresponding to a high logic value or logic value of '1'), thereby triggering the example latch 120 and controlling the example isolation transistor 124 to decouple the example voltage source 102 from the system.

Additionally, the example over-temperature determiner 100 toggles the example control signal 114 on and off (e.g., changing the voltage associated with the control signal 114 between a low voltage and a high voltage) to enable and/or disable the example thermistor bias network 104, thereby conserving power. The toggling of the example control signal 114 toggles the example transistor 112 to enable and/or disable the example thermistor bias network 104, as further described below. Although the examples disclosed herein describe the voltage levels and/or logic values as an example, any of the voltage levels and/or logic values may be inverted (e.g., switching a high voltage level with a low voltage level and/or logic "0" with logic "1"). In some examples, the over-temperature determiner 100 may enable the example thermistor bias network 104 periodically (e.g., every second) or aperiodically until a measured thermistor voltage 110 corresponding to a temperature reading is obtained, and then disable the example thermistor bias network 104 until an additional temperature reading is desired. In some examples, the over-temperature determiner 100 may adjust the frequency of toggling of the transistor 112 based on one or more previous temperature readings. For example, if the previous temperature reading(s) correspond to a high rate of increase (e.g., above a maximum rate threshold) and/or correspond to temperature that is close to (e.g., within X° of) a maximum threshold, the example over-temperature determiner 100 may increase the frequency of the toggling so that the thermistor bias network 104 is sampled more frequently. In such an example, to determine the rate of increase, the example over-temperature determiner 100 may store a previous voltage reading(s) to compare with a current voltage reading to identify the rate of increase. The example over-temperature determiner 100 is further described below in conjunction with FIG. 2.

The example voltage source 102 of FIG. 1 supplies voltage and/or current to the system. In the illustrated example of FIG. 1, the example voltage source 102 is a direct current (DC) voltage source, such as one or more lithium ion batteries. Additionally or alternatively, the example voltage source 102 may be an AC voltage source and/or any other device capable or supplying voltage and/or current to a system.

The example thermistor bias network 104 of FIG. 1 illustrates a circuit that, when enabled, outputs the example thermistor voltage 110 corresponding to a temperature. The example thermistor bias network 104 includes the example bias voltage 108 and a voltage divider (including the example thermistor 106) to generate the example thermistor voltage 110. The example thermistor 106 is a resistor that changes resistance based on the ambient temperature. Accordingly, as the resistance of the example thermistor 106 changes (e.g., due to a temperature change), the example thermistor voltage 110 changes due to the voltage dividing action between the thermistor 112 and the example resistor 105. As described above, the example over-temperature determiner 100 determines when an over-temperature occurs based on the example thermistor voltage 110. The example thermistor bias network 104 may be placed in any location. For example, on a connected wearable device, the example thermistor bias network 104 may be placed on or near the structures that are closed and/or in contact with the user, because that is where temperature may be most important. Additionally or alternatively, the example thermistor bias network 104 may be placed on or near the system (e.g., on or near a circuit board where the processor of the system resides). In some examples, the location of the thermistor bias network 104 may be based on user and/or manufacture preferences and/or limitations of the system and/or wearable device.

In the illustrated example of FIG. 1, the example thermistor 106 is a negative temperature coefficient (NTC) thermistor (e.g., decreasing resistance as the temperature increases). Additionally or alternatively, the example thermistor 106 may be a positive temperature coefficient (PTC) thermistor (e.g., increasing resistance as the temperature increases). When the example thermistor 106 is a PTC thermistor, the example over-temperature determiner 100 processes the example thermistor voltage 110 differently, as further described below in conjunction with FIG. 2.

The example transistor 112 of FIG. 1 enables and/or disables the example thermistor bias network 104 based on the voltage (e.g., the voltage corresponding to the example control signal 114) applied to the gate of the example transistor 112. For example, as illustrated in the example of FIG. 1, the example transistor 112 is a N-channel metal oxide field effect transistor (NMOS or N-MOSFET). When the example signal control signal 114 is a high voltage, the transistor 112 is enabled, thereby enabling the example thermistor bias network 104 by providing a path to ground. When the example control signal 114 is a low voltage (e.g., corresponding to a low logic value or a logic value of '0'), the transistor 112 is disabled, thereby disabling the example thermistor bias network 104 by eliminating the path to ground. In some examples, the example transistor 112 may be a P-channel MOSFET. In such examples, the example thermistor bias network 104 is enabled when the example control signal 114 is a low voltage and is disabled when the example control signal 114 is a high voltage.

As described above, the example thermal fault signal 116 of FIG. 1 is output by the example over-temperature determiner 100. The example thermal fault signal 116 is a low voltage when the temperature of the system is below the maximum temperature threshold. When the temperature increases to a value above the maximum temperature threshold, the example thermal fault signal 116 becomes a high voltage, thereby acting as a shut-down trigger. In some examples, the example thermal fault signal 116 is output the example system as a warning that the system will lose power (e.g., processor and/or other components). This allows the system to prepare for shut-down by any necessary means. To allow the system sufficient time to prepare for shut-down (e.g., decoupling of the example voltage source 102), the example buffer 118 delays the thermal fault trigger from decoupling the example voltage source 102. In some examples, the example signal 116 may trigger a thermal fault based on a low voltage (e.g., where the example signal 116 is a high voltage when a thermal fault has not occurred)

The example latch 120 of FIG. 1 receives the thermal fault signal 116 after being delayed by the example buffer 118. The example latch 120 is an electrical component that changes its state (e.g., from a high voltage to a low voltage or vice versa) based on a change (e.g., rising and/or falling edge) of a received signal. For example, when the example thermal fault signal 116 goes from a low voltage to a high voltage, the example latch 120 of FIG. 1 is triggered, changing the state of the example latch output 122. The latch 120 holds the state of the example latch output 122 until the latch 120 is reset. In the illustrated example of FIG. 1, the example latch 120 is a set-reset flip-flop that may be reset when, for example, a user restarts the system, plugs the system into another power source, etc. Alternatively, the example latch 120 may be a set-reset (SR) latch, a JK latch, a data (D) flip flop, a toggle (T) flip flop, a JK flip flop, and/or any other type of latch or flip flop. In such examples, the over-temperature determiner 100 may be set up accordingly to account for the type of latch or flip-flop used. The example latch output 122 is transmitted to the gate of the example isolation transistor 124.

The example isolation transistor 124 of FIG. 1, when disabled, isolates (e.g., decouples) the example voltage source 102 from the system. In the illustrated example of FIG. 1, the example isolation transistor 124 is an NMOS transistor. Accordingly, when the example latch output 122 is a high voltage, the example isolation transistor 124 is enabled, thereby coupling the example voltage source 102 to the system. When the example latch output 122 drops to a low voltage, the example isolation transistor 124 disables, thereby isolating the example voltage source 102 to the system. In some examples, the example isolation transistor 124 may be a PMOS transistor. In such an example, the example isolation transistor 124 couples the example voltage source 102 to the system when the example latch output 122 is a low voltage and isolates the example voltage source 102 from the system the example latch output 122 is a high voltage.

Figure 2:
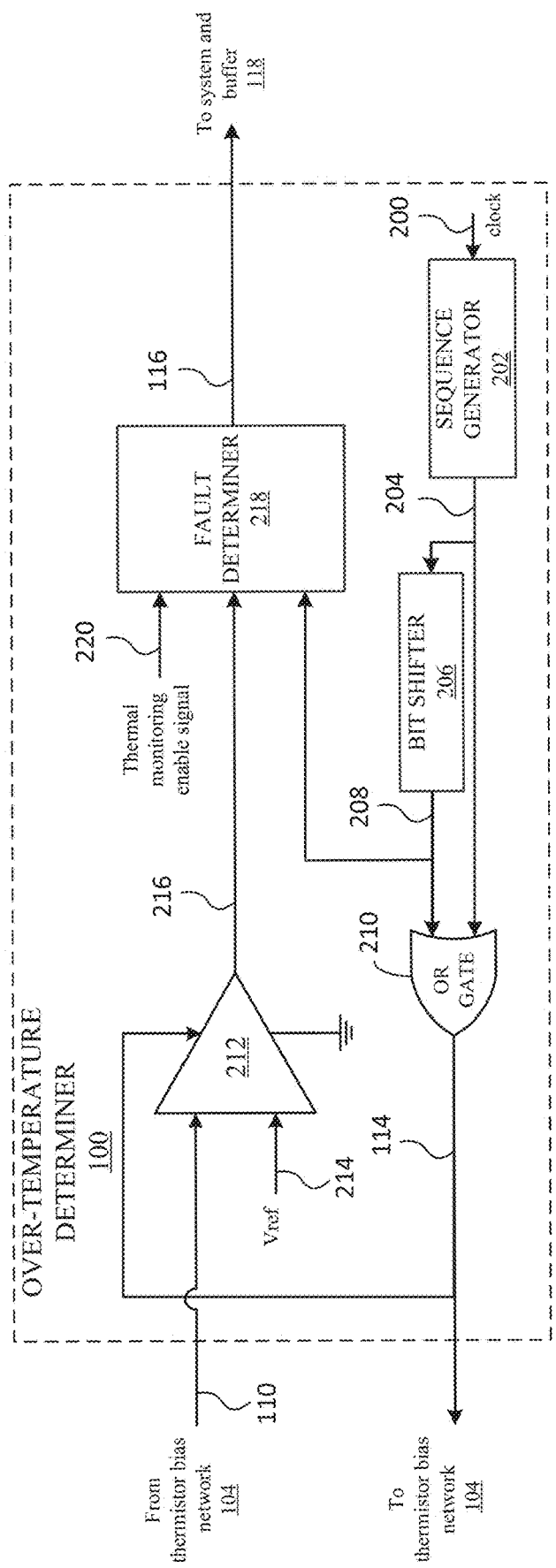
FIG. 2 is a block diagram of an example over-temperature determiner of FIG. 1.

FIG. 2 is a block diagram of the example over-temperature determiner 100 of FIG. 1 disclosed herein, to generate the example thermal fault signal 116 based on the example thermistor voltage 110 from the example thermistor bias network 104. While the example over-temperature determiner 100 is described in conjunction with the example thermistor bias network 104 of FIG. 1, the example over-temperature determiner 100 may be utilized to trigger thermal faults based on any temperature reading in any electrical device. The example over-temperature determiner 100 includes an example clock signal 200, an example sequence generator 202, an example sequence 204, an example bit shifter 206, an example shifted sequence 208, an example OR gate 210, an example comparator 212, an example reference voltage 214, an example comparator output 216, an example fault determiner 218, and an example thermal monitoring enable signal 220.

The example sequence generator 202 of FIG. 2 receives the example clock signal 200 and generates the example sequence signal 204 based on the clock. The example clock signal 200 is of a sufficiently low frequency that the pulses are wide enough for a reliable comparator on-time. The example sequence generator 202 generates and outputs the example sequence signal 204 such that (A) one bit or (B) two (or more) consecutive bits of the example sequence signal 204 are high, where the high bits in the sequence is as wide as a single clock cycle. For example, if the example sequence generator 202 may generate the example sequence signal 204 as an 8-bit sequence lasting one second corresponding to "00000110", where '0' corresponds to a low logic value (e.g., low voltage) and '1' corresponds to a high logic value (e.g., a voltage) and a bit is output consecutively for ⅛ of a second. The example sequence generator 202 may generate and output the example sequence signal 204 with one high bit to conserve power. However, doing so may lead to complications related to race conditions associated with the example comparator 212 (e.g., depending on the characteristics of the example comparator 212). Accordingly, in some examples, the example sequence generator may 204 may output two or more consecutive high bits to reduce the effect of the race conditions and assure stability of downstream components being toggled on by the high bits at the expense of additional power consumption. The example sequence generator 202 outputs the example sequence signal 204 to the example bit shifter 206 and the example OR gate 210.

The example bit shifter 206 of FIG. 2 shifts the example sequence signal 204 by duration corresponding to the bit of the sequence signal 204 to generate a shifted bit sequence (e.g., the example shifted sequence signal 208). For example, the example bit shifter 206 may shift the example sequence signal 204 of "00000110" (e.g., a bit sequence) back one bit to generate the example shifted bit sequence signal of "00000011" (e.g., a shifted bit sequence). In some examples, the example bit shifter 206 may shift the example sequence forward by one bit. The example bit shifter 206 may be implemented by a register, a buffer, and/or any other device capable of shifting the example sequence signal 204.

The example bit shifter 206 outputs the example shifted sequence signal 208 to the example OR gate 210 and the example fault determiner 218.

The example OR gate 210 of FIG. 2 is a logic gate that performs the logical OR function based on the inputs of the example OR gate 210. In the illustrated example of FIG. 2, the example OR gate 210 outputs a voltage based on the OR comparison of the example sequence signal 204 and the example shifted sequence signal 208. For example, if either one of the example sequence signal 204 or the example shifted sequence signal 208 is a high voltage, the example OR gate 210 will output a high voltage, else the example OR gate 210 will output a low voltage. The output of the example OR gate 210 is the example control signal 114 (e.g., used to enable the example thermistor bias network 104 of FIG. 1). Additionally, the example control signal 114 (e.g., the output of the example OR gate 210) is used to enable and/or disable the example comparator 212.

The example comparator 212 of FIG. 2 is compares the example thermistor voltage 110 to the example reference voltage 214 when the example control signal 114 is a high voltage to identify when the temperature associated with the system is too high. The example comparator 212 outputs an output voltage (e.g., the example comparator output signal 216) based on the comparison. In the illustrated example of FIG. 2, because the example thermistor 106 of FIG. 1 is an NTC thermistor, the example comparator 212 (A) outputs the example comparator output signal 216 as a first voltage (e.g., a high output voltage) when the example reference voltage 214 is higher than the example thermistor voltage 110 and (B) outputs the example comparator output signal 216 as a second voltage (e.g., a low output voltage) when the example reference voltage 214 is lower than the example thermistor voltage 110. The actual voltages of the first voltage and the second voltage depend on which terminal (e.g., the positive terminal or the negative terminal of the example comparator 212) the example voltages 110, 214 are entered into. In some examples, if the example thermistor of FIG. 1 is a PTC thermistor, the example comparator 212 (A) outputs the example comparator output signal 216 as a first voltage (e.g., a high voltage) when the example reference voltage 214 is lower than the example thermistor voltage 110 and (B) outputs the example comparator output signal 216 as a second voltage (e.g., a low voltage) when the example reference voltage 214 is higher than the example thermistor voltage 110. The example comparator output signal 216 is transmitted to the example fault determiner 218.

The example fault determiner 218 of FIG. 2 outputs the example thermal fault signal 116 based on the example shifted sequence signal 208, the example comparator output signal 216, and/or the thermal monitoring enable signal 220. The example thermal monitoring enable signal 220 is a signal that identifies when the example bias voltage 108 is substantially stable. The example bias voltage 108 may not be substantially stable during start-up of the device, for example. Any reading of from the example thermistor bias network 104 may be inaccurate during such a period. Accordingly, the example fault determiner 218 does not trigger a thermal fault (e.g., a high voltage as the example thermal fault signal 116) when the example thermal monitoring signal 220 is a voltage corresponding with an unstable bias voltage 108. Additionally, the example fault determiner 218 does not trigger a thermal fault when the example shifted sequence 208 is a low voltage. Accordingly, the example shifted sequence 208 is sometimes referred to as a fault mask (e.g., masking faults corresponding to setting time issues and/or race conditions) because the shifted sequence 208 effectively implements a setting time of one clock cycles to "unmask" the fault determiner 218.

A race condition is an undesirable condition where output is dependent of timing of other uncontrollable events, thereby leading to inaccurate thermistor voltage measurements and/or comparisons. Additionally, the example fault determiner 218 does not trigger a thermal fault when the comparator output 216 corresponds to an acceptable temperature level. For example, if the example comparator 212 outputs a high voltage when the example thermistor voltage 110 is above the example reference voltage 214 (e.g., corresponding to a temperature level that does not exceed a maximum temperature threshold), the example fault determiner 218 will not trigger a thermal fault. Accordingly, the example fault determiner 218 triggers a thermal fault when (A) the example thermal monitoring enable signal is a high voltage (e.g., signifying a substantially stable bias voltage 108), (B) the example shifted sequence signal 208 is a high voltage, and (C) the example comparator output signal 216 corresponds to a voltage associated with a temperature above the maximum temperature threshold. The example fault determiner 218 may be implemented as a look-up table and/or through various logic gates and/or transistors. As described above in conjunction with FIG. 1, the example thermal fault signal 116 is output to the system and the example buffer 118 of FIG. 1.

In operation, the example sequence generator 202 generates the example sequence signal 204 and the example bit shifter 206 adjusts the sequence signal 204 by one bit to generate the example adjusted sequence signal 208. For example, the sequence generator 202 may generate the sequence "00000110" (e.g., a low logic value or "0" for the first through fifth clock pulse of the sequence, a high logic value or "1" for the sixth and seventh clock pulse of the sequence, and a low logic value or "0" for the eighth clock pulse of the sequence) and the example bit shifter 206 generates the adjusted sequence "0000011" (e.g., a low logic value or "0" for the first through sixth clock pulse of the sequence and a high logic value or "1" for the seventh and eighth clock pulse of the sequence). Accordingly, the example OR gate 210 outputs a low voltage as the example control signal 114 for the first five clock pulses of the sequence and outputs a high voltage for the last three clock pulses of the sequence (e.g., OR(00000110, 00000011)= 00000111).

Because the example control signal is high for clock pulses six, seven, and eight, the example thermistor bias network 104 of FIG. 1 and the example comparator 212 are enabled for the duration of time corresponding to the sixth, seventh, and eighth clock pulses of the sequence. Accordingly, if, during the sixth through eighth clock pulses (e.g., when the comparator 212 is enabled), the example thermistor voltage 110 output by the example thermistor bias network 104 corresponds to a temperature above the maximum temperature threshold (e.g., an over-temperature), the example comparator 212 will output a first voltage corresponding to the over-temperature, otherwise the example comparator 212 will output a second voltage that corresponds to a normal temperature.

As described above, the example fault determiner 218 outputs a high voltage as the example thermal fault signal 116 when the inputs (e.g., the example shifted sequence 208, the example comparator output 216, and the example thermal monitoring enable signal 220) are at voltage levels (e.g., logic values) corresponding to a proper over-temperature measurement. Accordingly, to output the thermal fault, the example thermal monitoring enable signal 220 must be a high voltage ensuring that the example bias voltage 108 is substantially stable (e.g., so that the thermistor voltage 110 is an accurate representation of the temperature). Additionally, to output the thermal fault, the example shifted sequence 208 (e.g., "00000011") must be a high voltage or logic value. This means, that the thermistor voltage 110 is discarded for the duration of time corresponding the first through the sixth bits (e.g., for the first 6/8 of a second), even though the example comparator 212 and the example thermistor bias network 104 are enabled during the sixth bit. The example fault determiner 218 discards the thermistor voltage reading at the sixth bit to prevent race conditions and/or start-up issues of the example comparator 212 and/or the example thermistor bias network 104 that may lead to inaccurate thermistor voltage 110 readings. Accordingly, the example fault determiner 218 outputs a thermal fault (e.g., a high voltage as the example thermal fault signal 116), when the example thermal monitoring enable signal 220 is high, the example shifted sequence 208 is high, and the example comparator output 216 corresponds to an over-temperature reading.

While example manners of implementing the example over-temperature determiner 100 of FIG. 1 are illustrated in conjunction with FIG. 2, elements, processes and/or devices illustrated in conjunction with FIG. 2 may be combined, divided, re-arranged, omitted, eliminated and/or implemented in any other way. Further, although the example sequence generator 202, the example bit shifter 206, the example OR gate 210, the example comparator 212, the example fault determiner 218, and/or, more generally, the example over-temperature determiner 100 of FIG. 2 is implemented by hardware, the example sequence generator 202, the example bit shifter 206, the example OR gate 210, the example comparator 212, the example fault determiner 218, and/or, more generally, the example over-temperature determiner 100 of FIG. 2 may be implemented by machine readable instructions, software, firmware and/or any combination of hardware, machine readable instructions, software and/or firmware. Implementations using firmware, software, and/or a combination of hardware, machine readable instructions, software and/or firmware may have other advantages and/or disadvantages. For example, a software implementation may save more space; however, a software implementation may not trigger a thermal fault if a software malfunction occurs. Thus, for example, any of the example sequence generator 202, the example bit shifter 206, the example OR gate 210, the example comparator 212, the example fault determiner 218, and/or, more generally, the example over-temperature determiner 100 of FIG. 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sequence generator 202, the example bit shifter 206, the example OR gate 210, the example comparator 212, the example fault determiner 218, and/or, more generally, the example over-temperature determiner 100 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example over-temperature determiner 100 of FIG. 2 include elements, processes and/or devices in addition to, or instead of, those illustrated in conjunction with FIGS. 3-4, and/or may include more than one of any or all of the illustrated elements, processes and devices.

Figure 3:
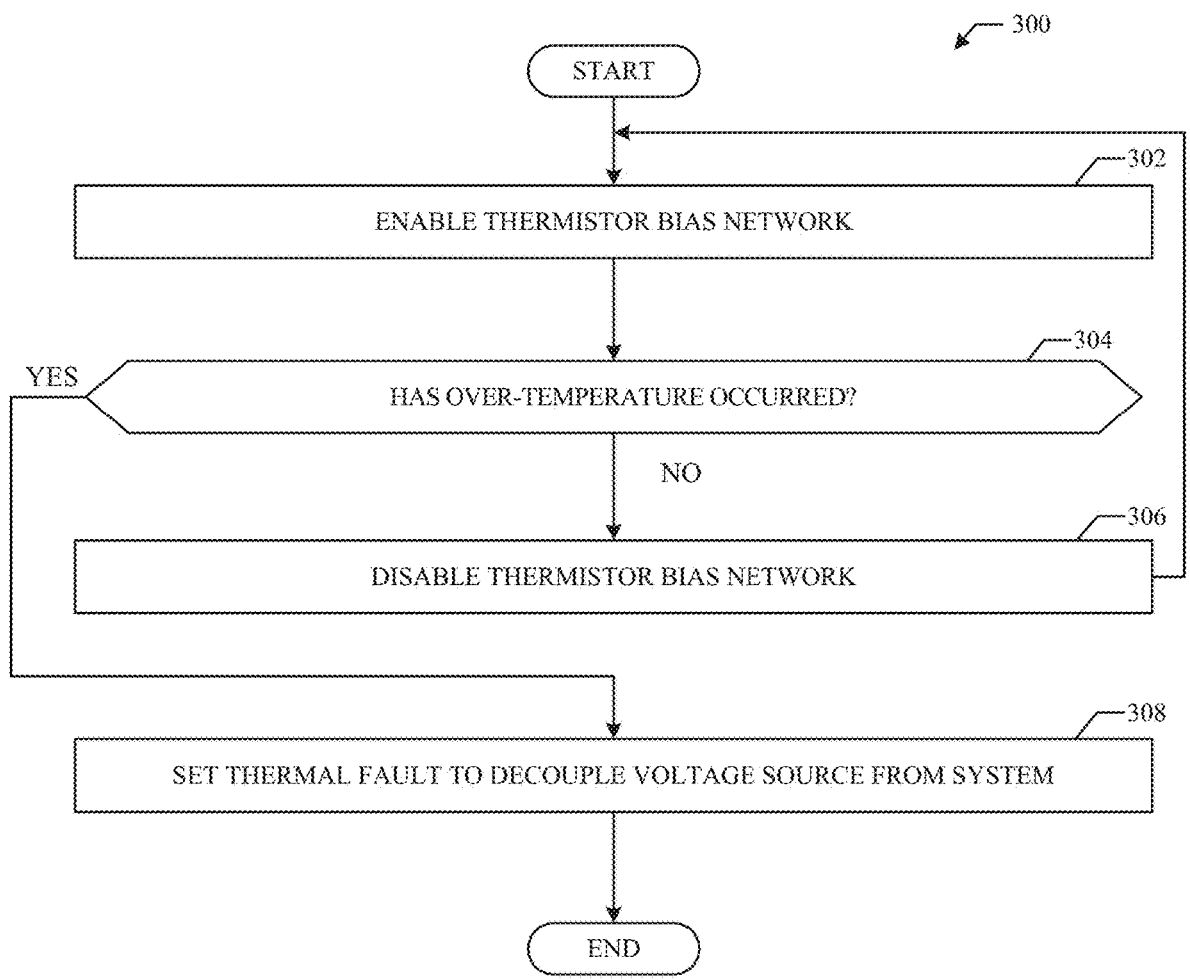
FIGS. 3-4 are flowchart representative of example machine readable instructions that may be executed to implement the example over-temperature determiner of FIGS. 1 and/or 2 to set a thermal fault when a temperature is above a maximum temperature threshold.
Figure 4:
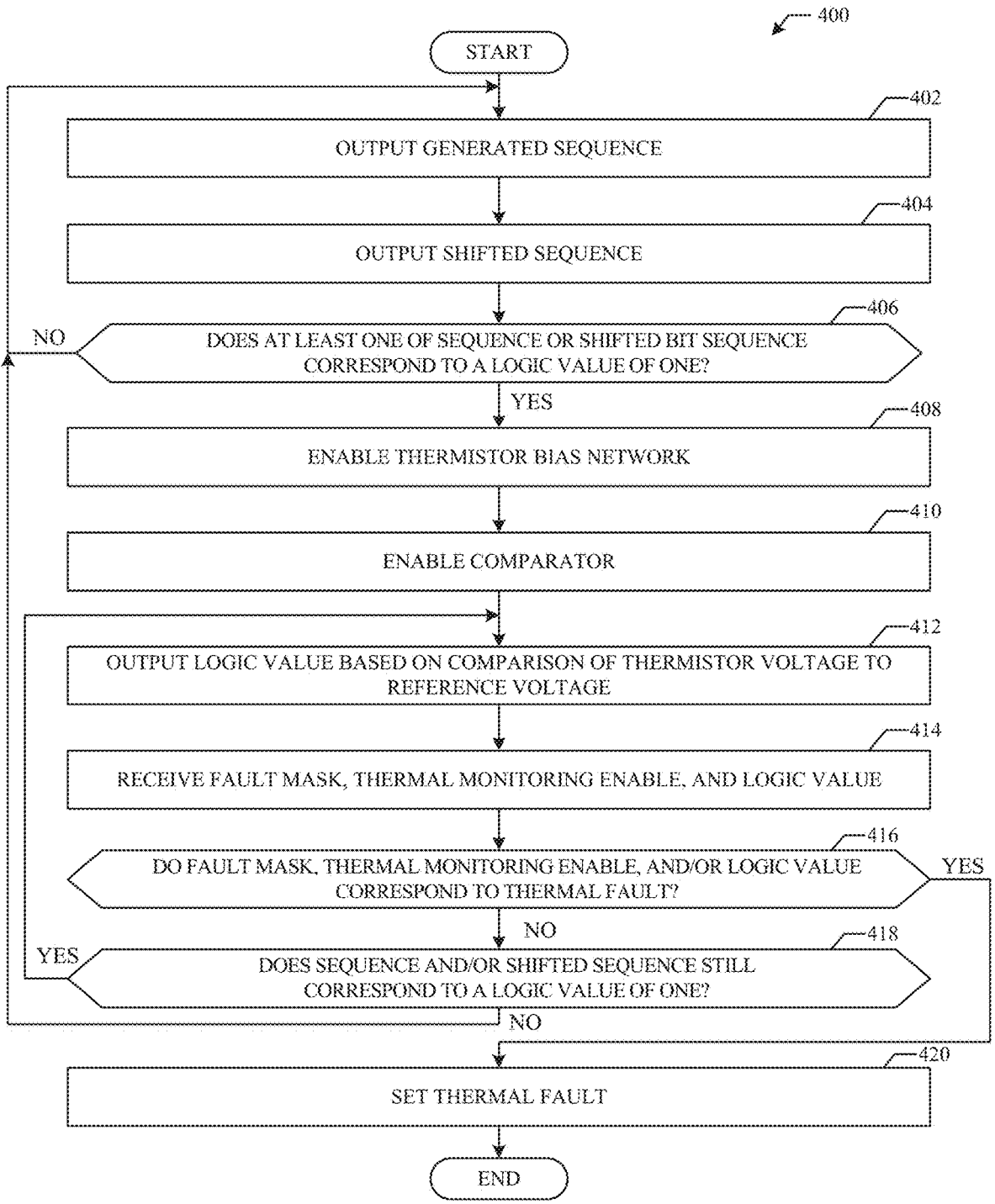

Flowcharts representative of example machine readable instructions for implementing the example over-temperature determiner 100 of FIG. 2 is shown in conjunction with FIGS. 3-4. In the examples, the machine readable instructions comprise a program for execution by a processor such as the processor 612 shown in the example processor platform 600 discussed below in connection with FIG. 6. The program may be embodied in machine readable instructions stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in conjunction with FIGS. 3-4, many other methods of implementing the example over-temperature determiner 100 of FIG. 2 may alternatively be used. For example, the order of execution of the blocks may be changed, and/or some of the blocks described may be changed, eliminated, or combined. Although the flowcharts of FIGS. 3-4 depict example operations in an illustrated order, these operations are not exhaustive and are not limited to the illustrated order. In addition, various changes and modifications may be made by one skilled in the art within the spirit and scope of the disclosure. For example, blocks illustrated in the flowchart(s) may be performed in an alternative order or may be performed in parallel.

As mentioned above, the example processes of FIGS. 3-4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

FIG. 3 is an example flowchart 300 representative of example machine readable instructions that may be executed to implement the example over-temperature determiner 100 of FIG. 1 to set thermal faults to decouple a voltage source from a system when a temperature increases above a maximum temperature threshold. Although, the flowchart 300 of FIG. 3 is described in conjunction with the example over-temperature determiner 100 and the example thermistor bias network 104 in the system of FIG. 1, the process may be implemented using any type of overheat determiner and/or thermistor bias network in any type of system.

At block 302, the example over-temperature determiner 100 enables the example thermistor bias network 104. The example over-temperature determiner 100 enables the example thermistor bias network 104 by providing the example control signal 114 (e.g., a voltage) to enable the example transistor 112 (e.g., via the gate of the example transistor 112) to provide a path to ground, thereby creating a voltage drop across the example thermistor 106. The voltage drop corresponds to the example thermistor voltage 110 that is transmitted to the example over-temperature determiner 100 to determine when the thermistor voltage 110 corresponds to an over-temperature.

At block 304, the example over-temperature determiner 100 determines if an over-temperature has occurred in the system based on the example thermistor voltage 110 of the example thermistor bias network 104. As described above, in conjunction with FIG. 2, the example over-temperature determiner 100 compares the example thermistor voltage 110 to a reference voltage that corresponds to a maximum temperature threshold. In this manner, when the thermistor voltage 110 rises or falls (e.g., depending on if the example thermistor 106 is a NTC or a PTC) to a voltage above or below the reference voltage, the example over-temperature determiner 100 determines that an over-temperature has occurred.

If the example over-temperature determiner 100 determines that an over-temperature has not occurred (block 304: NO), the example over-temperature determiner 100 disables the example thermistor bias network 104 (block 306). The example over-temperature determiner 100 disables the example thermistor bias network 104 by transmitting the example control signal 114 (e.g., a voltage) to disable the example transistor 112, thereby removing the path to ground and conserving power. The example over-temperature determiner 100 maintains the example control signal 114 to keep the example thermistor bias network 104 disabled until an additional thermistor voltage 110 measurement is desired. In this manner, the example over-temperature determiner 100 toggles the example thermistor bias network 104 on and off to identify over-temperature while conserving power. In some examples, the example over-temperature determiner 100 adjusts the frequency of the toggling based on (A) how close the example thermistor voltage 110 is from the example reference voltage 214 or (B) the rate of increase of the example thermistor voltage 110 (e.g., is the rate of increase above a maximum rate of increase).

If the example over-temperature determiner 100 determines that an over-temperature has occurred (block 304: YES), the example over-temperature determiner 100 sets a thermal fault to decouple the example voltage source 102 from the system (block 308). In some examples, the example over-temperature determiner 100 also transmits the thermal fault (e.g., a high voltage as the example thermal fault signal 116) to the system to inform the system to prepare for shut-down (e.g., removal of power). In such examples, the example buffer 118 may delay the thermal fault to delay the decoupling of the example voltage source 102 to allow the system to prepare for power-down.

FIG. 4 is an example flowchart 400 representative of example machine readable instructions that may be executed to implement the example over-temperature determiner 100 of FIGS. 1 and/or 2 to set thermal faults to decouple a voltage source from a system when a temperature increases above a maximum temperature threshold. Although, the flowchart 400 of FIG. 4 is described in conjunction with the example over-temperature determiner 100 of FIG. 2 in the system of FIG. 1, the process may be implemented using any type of overheat determiner in any type of system.

At block 402, the example sequence generator 202 outputs the generated example sequence 204. As described above in conjunction with FIG. 2, the example sequence generator 202 may generate a bit sequence (or logic sequence) of one high bit and/or with two or more consecutive high bits (e.g., high voltages) and the remaining bits being low bits (e.g., low voltages). At block 404, the example bit shifter 206 outputs the example shifted sequence 208 (e.g., corresponding the example sequence 204 shifted by one bit, a shifted bit or logic sequence). At block 406, the example OR gate 210 determines if at least one of the example sequence 204 or the example shifted sequence 208 correspond to a logic value of '1' (e.g. a high voltage). If the example OR gate 210 determines that at least one of the example sequence 204 or the example shifted sequence 208 does not correspond to a logic value of '1' (block 406: NO), the process returns to block 402 to continue to output the example sequence 204 until at least one of the example sequence 204 or the example shifted sequence 208 does correspond to a logic value of '1.'

If the example OR gate 210 determines that at least one of the example sequence 204 or the example shifted sequence 208 does correspond to a logic value of '1' (block 406: YES), the example OR gate 210 enables the example thermistor bias network 104 (block 408). As described above in conjunction with FIG. 2, the example OR gate 210 enables the example thermistor bias network 104 by outputting a high voltage (e.g., as the example control signal 114) to the gate of the example transistor 112 of FIG. 1, thereby enabling the example transistor 112 and providing a path to ground. At block 410, the example OR gate 210 enables the example comparator 212. As described above in conjunction with FIG. 2, the example OR gate 210 enables the example comparator 212 by providing a high voltage as the example control signal 114 to provide power to the example comparator 212.

At block 412, the example comparator 212 outputs a logic value (e.g., as the example comparator output 216) based on a comparison of the example thermistor voltage 110 (e.g., via the example thermistor bias network 104) to the example reference voltage 214. As described above in conjunction with FIG. 2, the example reference voltage 214 corresponds to a maximum temperature voltage. In this manner, the example comparator 212 flags or otherwise identifies an over-temperature by outputting a first voltage when the example thermistor voltage 110 is above the example reference voltage 214 and output a second voltage when the example thermistor voltage 110 is below the example reference voltage 214 (e.g., the first and second voltages depending on whether the example thermistor 106 is an NTC or a PTC thermistor).

At block 414, the example fault determiner 218 receives a fault mask (e.g., the example shifted sequence 208), the example thermal monitoring enable signal 220, and the example logic value (e.g., the example comparator output 216). At block 416, the example fault determiner 218 determines if the fault mask, the example thermal monitoring enable signal 220, and the example logic value corresponds to a thermal fault. As described above in conjunction with FIG. 2, the example fault determiner 218 determines if the fault mask, the example thermal monitoring enable signal 220, and the example logic value corresponds to a thermal fault when the example thermal monitoring enable signal 220 is a high voltage, the example fault mask (e.g., the example shifted sequence 208) is a high voltage, and the logic value (e.g., the example comparator output 216 corresponds to a voltage indicative of an over-temperature measurement.

If the example fault determiner 218 determines that the fault mask, the example thermal monitoring enable signal 220, and the example logic value does not correspond to a thermal fault (block 416: NO), the example OR gate 210 determiners if at least one of the example sequence 204 or the example shifted sequence 208 still corresponds to a logic value of '1' (block 418). If the example OR gate 210 determines that the at least one of the example sequence 204 or the example shifted sequence 208 still corresponds to a logic value of '1' (block 418: YES), the example process returns to block 412 to continue to monitor the example thermistor voltage 110. If the example OR gate 210 determines that the at least one of the example sequence 204 or the example shifted sequence 208 does not still correspond to a logic value of '1' (block 418: NO), the process returns to block 402 to continue to output the example sequence 204.

If the example fault determiner 218 determines that the fault mask, the example thermal monitoring enable signal 220, and the example logic value does correspond to a thermal fault (block 416: YES), the example fault determiner 218 sets a thermal fault (block 420) by outputting a high voltage as the example thermal fault signal 116 to the system and/or the example buffer 118 of FIG. 1.

Figure 5:
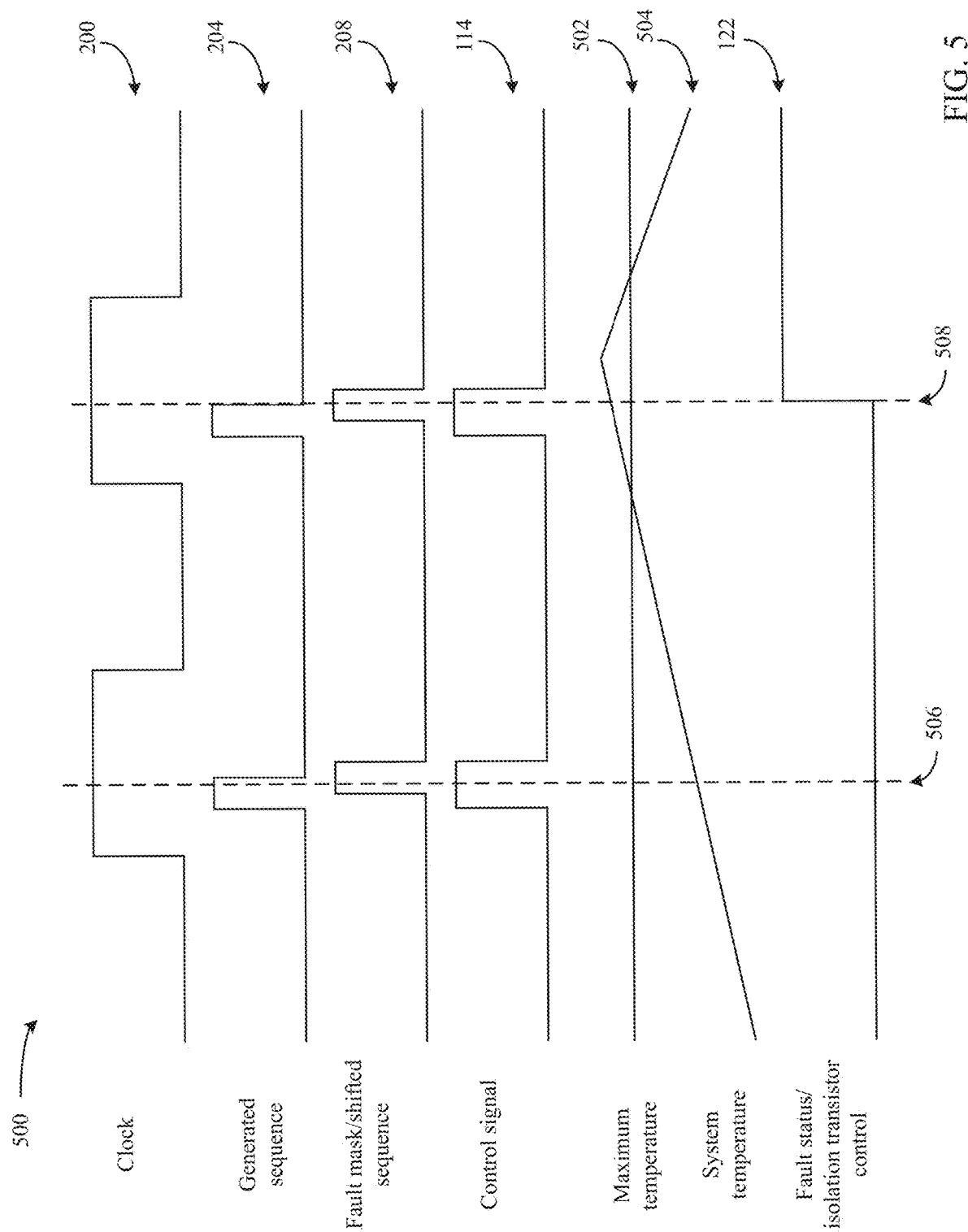
FIG. 5 is an example timing diagram illustrating the functionality of the example over-temperature protection circuit of FIG. 1.

FIG. 5 is an example timing diagram 500 illustrating the functionality of the example over-temperature determiner 100 of FIGS. 1 and/or 2 in the example system of FIG. 1. The example timing diagram 500 includes the example clock signal 200, the example sequence 204, the example shifted sequence 208, the example control signal 114, and the example thermal fault signal 116 of FIGS. 1 and/or 2. The example timing diagram 500 further includes an example maximum temperature threshold 502, an example system temperature 504, a first example time 506, and a second example time 508. The maximum temperature threshold 502 corresponds to the example reference voltage 214 and the example system temperature 504 corresponds to the example thermistor voltage 110.

As shown at the first example time 506 of the example timing diagram 500 of FIG. 5, the example sequence 204 and the example shifted sequence 208 are high, thereby resulting in the example control signal 114 being a high voltage. Accordingly, at the first example time 506, the example comparator 212 of FIG. 2 compares the example thermistor voltage 110 (e.g., corresponding to the example system temperature 504) to the example reference voltage 214 (e.g., corresponding to the example maximum temperature threshold 502). Because the example system temperature 504 is below the example maximum temperature threshold 502, the example comparator 212 outputs a voltage corresponding to an acceptable operating temperature. Accordingly, the example thermal fault signal 116 does not trigger a thermal fault at the first example time 506.

At the second example time 508 of FIG. 5, the example sequence 204 and the example shifted sequence 208 are high, thereby resulting in the example control signal 114 being a high voltage. Accordingly, at the first example time 506, the example comparator 212 of FIG. 2 compares the example thermistor voltage 110 (e.g., corresponding to the example system temperature 504) to the example reference voltage 214 (e.g., corresponding to the example maximum temperature threshold 502). Because the example system temperature 504 is above the example maximum temperature threshold 502, the example comparator 212 outputs a voltage corresponding to an over-temperature. Accordingly, the example thermal fault signal 116 triggers a thermal fault at the second example time 508. As shown in the example thermal fault signal 116, the thermal fault is triggered slightly after the example shifted sequence 208 goes high. As described above in conjunction with FIG. 1, the example buffer 118 delays the thermal fault to allow the example over-temperature determiner 100 to transmit a warning to the system to prepare for power-down.

Figure 6:
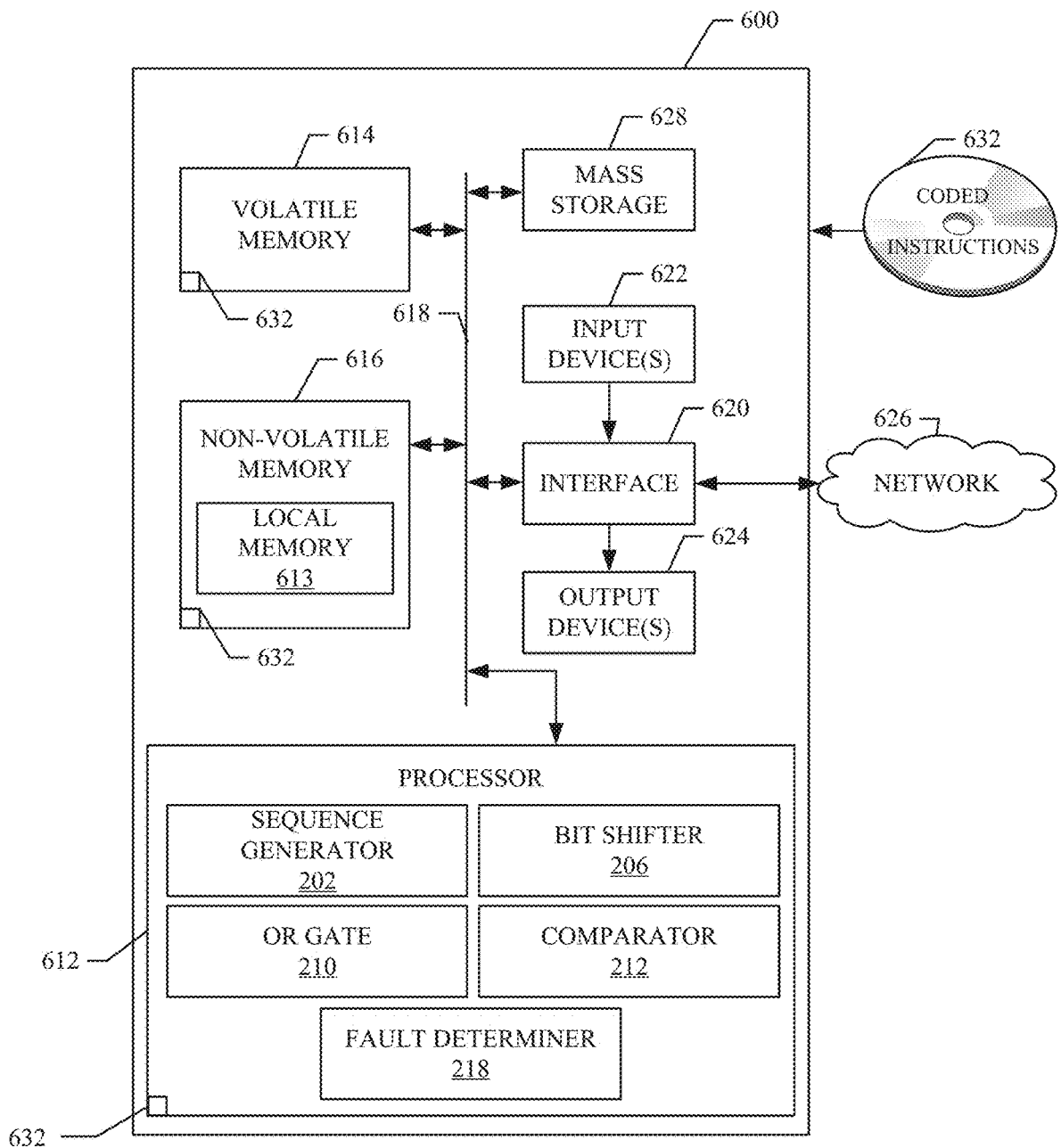
FIG. 6 is a block diagram of an example processor platform that may be utilized to execute the example instructions of FIGS. 3 and/or 4 to implement the example over-temperature protection circuit of FIG. 1 and/or 2.

FIG. 6 is a block diagram of an example processor platform 600 capable of executing the instructions of FIGS. 3 and 4 to implement the example over-temperature determiner 100 of FIG. 2. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by integrated circuits, logic circuits, microprocessors or controllers from any desired family or manufacturer.

The processor 612 of the illustrated example includes the example memory 613 (e.g., a cache). The example processor 612 of FIG. 6 executes the instructions of FIGS. 3 and 4 to implement the example sequence generator 202, the example bit shifter 206, the example OR gate 210, the example comparator 212, and/or the example fault determiner 218 to implement the example over-temperature determiner 100 (FIG. 1). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3 and 4 may be stored in the mass storage device 628, in the volatile memory 614, in the non-volatile memory 616, and/or on a removable tangible computer readable storage medium such as a CD or DVD.

Example 1 is an apparatus to implement over-temperature fault protection in wearable devices and other electronic devices. Example 1 includes a voltage source. Example 1 further includes a thermistor bias network to, when enabled, output a thermistor voltage. Example 1 further includes an over-temperature determiner to enable the thermistor bias network and, when the thermistor voltage corresponds to a temperature above a maximum temperature threshold, output a fault. Example 1 further includes an isolation transistor to couple the voltage source to a system and, when the over-temperature determiner outputs the fault, decouple the voltage source from the system.

Example 2 includes all the subject matter of Example 1, wherein the thermistor bias network includes a thermistor and a transistor, the thermistor bias network being enabled based on a first voltage applied to the transistor.

Example 3 includes all the subject matter of Example 1, wherein the over-temperature determiner is to transmit the fault to the system.

Example 4 includes all the subject matter of Example 1, further including a latch to, when the over-temperature determiner outputs the fault, apply a voltage to a gate of the isolation transistor.

Example 5 includes all the subject matter of Example 4, further including a buffer to delay the fault prior to being transmitted to the latch.

Example 6 includes all the subject matter of Examples 1, 4, or 5, wherein the over-temperature determiner is to toggle the thermistor bias network on and off at a toggling frequency.

Example 7 includes all the subject matter of Example 6, wherein the over-temperature determiner is to, when the temperature is nearing the maximum threshold temperature, increase the toggling frequency.

Example 8 includes all the subject matter of Example 6, wherein the over-temperature determiner is to, when the temperature is increasing at a rate above a maximum rate threshold, increase the toggling frequency.

Example 9 includes all the subject matter of Examples 1, 4, or 5, wherein the over-temperature determiner includes a comparator.

Example 10 is an apparatus to implement over-temperature fault protection in wearable devices and other electronic devices. Example 10 includes a comparator to provide an output voltage based on a comparison of a thermistor voltage to a reference voltage. Example 10 further includes a logic gate to, when at least one of a bit sequence or a shifted bit sequence is a first voltage, output a second voltage to at least one of (A) enable a thermistor bias network or (B) enable the comparator. Example 10 further includes a fault determiner to, when the shifted bit sequence is the first voltage and the output voltage corresponds to a temperature above a maximum temperature threshold, output a fault.

Example 11 includes all the subject matter of Example 10, further including a sequence generator to generate a bit sequence and a bit shifter to generate the shifted bit sequence by shifting the bit sequence.

Example 12 includes all the subject matter of Example 10, wherein the thermistor voltage corresponds to a temperature of a system and the reference voltage corresponds to the maximum temperature threshold.

Example 13 includes all the subject matter of Example 10, wherein the output voltage is (A) a third voltage when the comparison corresponds to a first temperature above the maximum temperature threshold and (B) a fourth voltage when the comparison corresponds to a second temperature below the maximum temperature threshold.

Example 14 includes all the subject matter of Example 10, wherein the logic gate is to output a third voltage different than the first voltage to at least one of (A) disable the thermistor bias network or (B) disable the comparator.

Example 15 includes all the subject matter of Examples 10-14, wherein the fault determiner is to output the fault to an isolation transistor to decouple a voltage source from a system.

Example 16 includes all the subject matter of Example 15, wherein decoupling the voltage source from the system powers down the system.

Example 17 includes all the subject matter of Examples 10-14, wherein the bit sequence includes two or more sequential logic values, the bit sequence including at least one high logic value.

Example 18 includes all the subject matter of Examples 10-14, wherein the bit sequence includes at least two consecutive high logic values.

Example 19 includes all the subject matter of Examples 10-14, wherein the fault determiner is to output the fault when an enable signal corresponds to a substantially stable bias voltage, the substantially stable bias voltage ensuring that the thermistor voltage is accurate.

Example 20 is a method to implement over-temperature fault protection in wearable devices and other electronic devices. Example 20 includes toggling a thermistor bias network on and off to enable or disable the thermistor bias network. Example 20 further includes, when the thermistor bias network is enabled, receiving a thermistor voltage from the thermistor bias network. Example 20 further includes, when the thermistor voltage corresponds to a temperature above a maximum temperature threshold, decoupling a voltage source from a system.

Example 21 includes all the subject matter of Example 20, wherein the thermistor bias network includes a thermistor and a transistor, the toggling of the thermistor including applying a first voltage and a second voltage to a gate of the transistor.

Example 22 includes all the subject matter of Example 20, further including transmitting a fault to the system.

Example 23 includes all the subject matter of Example 22, wherein the decoupling the voltage source from the system includes transmitting the fault to a latch, the latch to apply a voltage to a gate of an isolation transistor.

Example 24 includes all the subject matter of Example 23, wherein applying the voltage to the gate of the isolation transistor decouples the voltage source from the system.

Example 25 includes all the subject matter of Example 23, wherein the fault transmitted to a buffer prior to being transmitted to the latch.

Example 26 includes all the subject matter of Examples 20-23, wherein the toggling of the thermistor bias network includes toggling at a toggling frequency.

Example 27 includes all the subject matter of Example 26, further including, when the temperature is nearing the maximum threshold temperature, increasing the toggling frequency.

Example 28 includes all the subject matter of Example 26, further including, when the temperature is increasing at a rate above a maximum rate threshold, increasing the toggling frequency.

Example 29 is a method to implement over-temperature fault protection in wearable devices and other electronic devices. Example 29 includes providing, via a comparator, an output voltage based on a comparison of a thermistor voltage to a reference voltage. Example 29 further includes, when at least one of a bit sequence or a shifted bit sequence is a first voltage, outputting a second voltage to at least one of (A) enable a thermistor bias network or (B) enable the comparator. Example 29 further includes, when the shifted bit sequence is the first voltage and the output voltage corresponds to a temperature above a maximum temperature threshold, outputting a fault.

Example 30 includes all the subject matter of Example 29, further including generating the bit sequence and generating the shifted bit sequence by shifting the bit sequence.

Example 31 includes all the subject matter of Example 29, wherein the thermistor voltage corresponds to a temperature of a system and the reference voltage corresponds to the maximum temperature threshold.

Example 32 includes all the subject matter of Example 29, wherein the output voltage is (A) a third voltage when the comparison corresponds to a first temperature above the maximum temperature threshold and (B) a fourth voltage when the comparison corresponds to a second temperature below the maximum temperature threshold.

Example 33 includes all the subject matter of Example 29, further including outputting a third voltage different than the first voltage to at least one of (A) disable the thermistor bias network or (B) disable the comparator.

Example 34 includes all the subject matter of Examples 29-33, further including outputting the fault to an isolation transistor to decouple a voltage source from a system.

Example 35 includes all the subject matter of Example 34, wherein decoupling the voltage source from the system powers down the system.

Example 36 includes all the subject matter of Examples 29-33, wherein the bit sequence includes two or more sequential logic values, the bit sequence including at least one high logic value.

Example 37 includes all the subject matter of Examples 29-33, wherein the bit sequence includes at least two consecutive high logic values.

Example 38 includes all the subject matter of Examples 29-33, further including outputting the fault when an enable signal corresponds to a substantially stable bias voltage, the substantially stable bias voltage ensuring that the thermistor voltage is accurate.

Example 39 is an apparatus to implement over-temperature fault protection in wearable devices and other electronic devices. Example 39 includes a voltage source. Example 39 further includes a first means to, when enabled, output a thermistor voltage. Example 39 further includes a second means to enable the first means and, when the thermistor voltage corresponds to a temperature above a maximum temperature threshold, output a fault. Example 39 further includes a third means to couple the voltage source to a system and, when the second means outputs the fault, decouple the voltage source from the system.

Example 40 includes all the subject matter of Example 39, wherein the first means includes a thermistor and a transistor, the first means being enabled based on a first voltage applied to the transistor.

Example 41 includes all the subject matter of Example 39, wherein the second means is to transmit the fault to the system.

Example 42 includes all the subject matter of Example 39, further including a fourth means to, when the second means outputs the fault, apply a voltage to the third means.

Example 43 includes all the subject matter of Example 42, further including a fifth means to delay the fault prior to being transmitted to the fourth means.

Example 44 includes all the subject matter of Examples 39, 42, or 43, wherein the second means is to toggle the first means on and off at a toggling frequency.

Example 45 includes all the subject matter of Example 44, wherein the second means is to, when the temperature is nearing the maximum threshold temperature, increase the toggling frequency.

Example 46 includes all the subject matter of Example 44, wherein the second means is to, when the temperature is increasing at a rate above a maximum rate threshold, increase the toggling frequency.

Example 47 includes all the subject matter of Examples 39, 42, or 43, wherein the second means includes a comparator.

Example 48 is an apparatus to implement over-temperature fault protection in wearable devices and other electronic devices. Example 48 includes a first means to provide an output voltage based on a comparison of a thermistor voltage to a reference voltage. Example 48 further includes a second means to, when at least one of a bit sequence or a shifted bit sequence is a first voltage, output a second voltage to at least one of (A) enable a thermistor bias network or (B) enable the first means. Example 48 further includes a third means to, when the shifted bit sequence is the first voltage and the output voltage corresponds to a temperature above a maximum temperature threshold, output a fault.

Example 49 includes all the subject matter of Example 48, further including a fourth means to generate a bit sequence and a fifth means to generate the shifted bit sequence by shifting the bit sequence.

Example 50 includes all the subject matter of Example 48, wherein the thermistor voltage corresponds to a temperature of a system and the reference voltage corresponds to the maximum temperature threshold.

Example 51 includes all the subject matter of Example 48, wherein the output voltage is (A) a third voltage when the comparison corresponds to a first temperature above the maximum temperature threshold and (B) a fourth voltage when the comparison corresponds to a second temperature below the maximum temperature threshold.

Example 52 includes all the subject matter of Example 48, wherein the second means is to output a third voltage different than the first voltage to at least one of (A) disable the thermistor bias network or (B) disable the first means.

Example 53 includes all the subject matter of Examples 48-52, wherein the third means is to output the fault to an isolation transistor to decouple a voltage source from a system.

Example 54 includes all the subject matter of Example 53, wherein decoupling the voltage source from the system powers down the system.

Example 55 includes all the subject matter of Examples 48-52, wherein the bit sequence includes two or more sequential logic values, the bit sequence including at least one high logic value.

Example 56 includes all the subject matter of Examples 48-52, wherein the bit sequence includes at least two consecutive high logic values.

Example 57 includes all the subject matter of Examples 48-52, wherein the third means is to output the fault when an enable signal corresponds to a substantially stable bias voltage, the substantially stable bias voltage ensuring that the thermistor voltage is accurate.

From the foregoing, it will be appreciated that the above disclosed methods, apparatus, and articles of manufacture may be used to implement over-temperature fault protection in wearable devices and other electronic devices. Conventional techniques of providing over-temperature protection include implementing an analog to digital converter to convert a thermistor voltage to a temperature level and processing the temperature level to determine when the temperature is higher than a maximum temperature threshold. However, such conventional techniques require significant power. Examples disclosed herein alleviate such problems by utilizing a comparator to determine over-temperature. Comparators require less power than analog to digital converters. To conserve even more power, examples disclosed herein toggle a thermistor bias network and the comparator to measure temperature periodically or aperiodically, thereby conserving power between measurements. Using examples disclosed herein, an over-temperature protection is achieved consuming less than of 10 microamps.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a thermistor bias network to, when enabled, output a thermistor voltage corresponding to a temperature of a thermistor in the thermistor bias network;
   an over-temperature determiner to:
      toggle the thermistor bias network on and off at a first frequency;
      when the temperature corresponding to the thermistor voltage exhibits a rate of increase above a rate threshold, toggle the thermistor bias network on and off at a second frequency, the second frequency higher than the first frequency; and
      when the thermistor voltage corresponding to the temperature exceeds a maximum temperature threshold, output a fault; and
   an isolation transistor to:
      couple a voltage source to a system; and
      when the over-temperature determiner outputs the fault, decouple the voltage source from the system.

2. The apparatus of claim 1, wherein the thermistor bias network includes the thermistor and a transistor, the thermistor bias network enabled based on a first voltage applied to the transistor.

3. The apparatus of claim 1, wherein the over-temperature determiner is to transmit the fault to the system.

4. The apparatus of claim 1, further including a latch to, when the over-temperature determiner outputs the fault, apply a voltage to a gate of the isolation transistor.

5. The apparatus of claim 4, further including a buffer to delay the fault prior to being transmitted to the latch.

6. The apparatus of claim 1, wherein the over-temperature determiner is to toggle the thermistor bias network on and off at the second frequency when the thermistor voltage corresponding to the temperature is within a second temperature threshold of the maximum temperature threshold.

7. The apparatus of claim 1, wherein the over-temperature determiner includes a comparator.

8. An apparatus comprising:
   a comparator to provide an output voltage based on a comparison of a thermistor voltage corresponding to a temperature of a thermistor in a thermistor bias circuit to a reference voltage;
   a sequence generator to generate a bit sequence;
   a bit shifter to generate a shifted bit sequence by shifting the bit sequence;
   a logic gate to:
      when at least one of the bit sequence or the shifted bit sequence is a first voltage, output a second voltage to (A) enable the thermistor bias circuit to output the thermistor voltage and (B) enable the comparator, when the thermistor voltage is below a first threshold, the bit sequence of the sequence generator is to cause the logic gate to enable the thermistor bias circuit at a first frequency, when the thermistor voltage is above the first threshold, the bit sequence of the sequence generator is to cause the logic gate to enable the thermistor bias circuit at a second frequency greater than the first frequency; and
   a fault determiner to, when the shifted bit sequence is the first voltage and the thermistor voltage indicates the temperature of the thermistor is above a maximum temperature threshold, output a fault.

9. The apparatus of claim 8, wherein the thermistor voltage corresponds to a system temperature and the reference voltage corresponds to the maximum temperature threshold.

10. The apparatus of claim 8, wherein the output voltage is (A) a third voltage when the comparison corresponds to the temperature above the maximum temperature threshold and (B) a fourth voltage when the comparison corresponds to the temperature below the maximum temperature threshold.

11. The apparatus of claim 8, wherein the logic gate is to output a third voltage different than the first voltage to (A) disable the thermistor bias circuit and (B) disable the comparator.

12. The apparatus of claim 8, wherein the fault determiner is to output the fault to an isolation transistor to decouple a voltage source from a system.

13. The apparatus of claim 12, wherein decoupling the voltage source from the system powers down the system.

14. The apparatus of claim 8, wherein the bit sequence includes two or more sequential logic values, the bit sequence including at least one high logic value.

15. The apparatus of claim 8, wherein the bit sequence includes at least two consecutive high logic values.

16. The apparatus of claim 8, wherein the fault determiner is to output the fault when an enable signal corresponds to a substantially stable bias voltage, the substantially stable bias voltage ensuring that the thermistor voltage is accurate.

17. A method comprising:
- toggling a thermistor bias circuit on and off at a first frequency;
- when the thermistor bias circuit is enabled, receiving a thermistor voltage from the thermistor bias circuit;
- when a temperature corresponding to the thermistor voltage exhibits a rate of increase above a rate threshold, toggling the thermistor bias circuit on and off at a second frequency, the second frequency higher than the first frequency; and
- when the thermistor voltage corresponds to the temperature being above a maximum temperature threshold, decoupling a voltage source from a system.

\* \* \* \* \*